United States Patent
Ebe et al.

(10) Patent No.: US 12,345,857 B2
(45) Date of Patent: Jul. 1, 2025

(54) OPTICAL SYSTEM AND IMAGE PICKUP APPARATUS

(71) Applicant: CANON KABUSHIKI KAISHA, Tokyo (JP)

(72) Inventors: Hiroki Ebe, Tochigi (JP); Shinichiro Saito, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 526 days.

(21) Appl. No.: 17/744,823

(22) Filed: May 16, 2022

(65) Prior Publication Data
US 2022/0382019 A1    Dec. 1, 2022

(30) Foreign Application Priority Data
May 20, 2021    (JP) .................. 2021-085396

(51) Int. Cl.
*G02B 13/00*   (2006.01)
*G02B 1/04*    (2006.01)
*G02B 9/60*    (2006.01)

(52) U.S. Cl.
CPC ......... *G02B 13/0045* (2013.01); *G02B 1/041* (2013.01); *G02B 9/60* (2013.01); *G02B 13/0015* (2013.01)

(58) Field of Classification Search
CPC ............................ G02B 13/0045; G02B 1/041
USPC ........ 359/676, 708, 713, 714, 755, 760, 766
See application file for complete search history.

(56) References Cited

U.S. PATENT DOCUMENTS

| | | |
|---|---|---|
| 9,995,925 B2 | 6/2018 | Ebe |
| 10,718,929 B2 | 7/2020 | Saito et al. |
| 10,935,705 B2 | 3/2021 | Ebe |
| 10,935,755 B2 | 3/2021 | Saito et al. |
| 11,073,684 B2 | 7/2021 | Saito |
| 11,150,467 B2 | 10/2021 | Saito |
| 2009/0067063 A1* | 3/2009 | Asami .................. G02B 13/146 359/772 |

(Continued)

FOREIGN PATENT DOCUMENTS

JP    2019-035781 A    3/2019

OTHER PUBLICATIONS

Schott N-LAK8, Datasheet [online]. Schott, 2014 [retrieved on Oct. 31, 2024]. Retrieved from the Internet: <https://media.schott.com/api/public/content/efc13fa680cf4cca84b8ed29b87d8744?v=fb43de21> (Year: 2014).*

(Continued)

*Primary Examiner* — Wyatt A Stoffa
*Assistant Examiner* — Seth D Moser
(74) *Attorney, Agent, or Firm* — Carter, DeLuca & Farrell LLP

(57) ABSTRACT

An optical system consists of a front unit and a rear unit. The front unit consists of a first lens having a positive refractive power, a second lens disposed on an image side of the first lens and having a positive refractive power, and a third lens. Each of the first lens and the second lens has a refractive index of 1.7 or higher for d-line. The rear unit consists of two or more and four or fewer lenses and includes a fourth lens having a positive refractive power and a fifth lens adjacent to the fourth lens and having a negative refractive power. Each of the fourth lens and the fifth lens is made of an organic material. A predetermined condition is satisfied.

20 Claims, 5 Drawing Sheets

(56) References Cited

U.S. PATENT DOCUMENTS

| | | |
|---|---|---|
| 2014/0118603 A1 | 5/2014 | Saito |
| 2014/0139931 A1* | 5/2014 | Kubota ................ G02B 9/60 |
| | | 359/740 |
| 2019/0302430 A1 | 10/2019 | Ebe |
| 2020/0310088 A1 | 10/2020 | Saito |
| 2021/0149165 A1 | 5/2021 | Saito et al. |
| 2021/0311290 A1 | 10/2021 | Gyoda et al. |

OTHER PUBLICATIONS

Schott SF1, Datasheet [online]. Schott, 2016 [retrieved on Oct. 31, 2024]. Retrieved from the Internet: <https://media.schott.com/api/public/content/bb675cb9047d468b9e3d75dc05952882?v=57a4c9fb> (Year: 2016).*

Schott N-BALF4, Datasheet [online]. Schott, 2014 [retrieved on Oct. 31, 2024]. Retrieved from the Internet: <https://mss-p-009-delivery.stylelabs.cloud/api/public/content/710baa54349548fe9babbd4d86732e04?v=3d0f1ce6> (Year: 2014).*

Schott LAFN7, Datasheet [online]. Schott, 2014 [retrieved on Oct. 31, 2024]. Retrieved from the Internet: <https://mss-p-009-delivery.stylelabs.cloud/api/public/content/c842d31345bc40ae86b67732d6eb4eea?v=8553dd92> (Year: 2014).*

* cited by examiner

OPTICAL SYSTEM AND IMAGE PICKUP APPARATUS

BACKGROUND OF THE INVENTION

Field of the Invention

The present invention relates to an optical system and an image pickup apparatus.

Description of the Related Art

An optical system that is small and lightweight but has high performance (high imaging performance) has recently been demanded. Japanese Patent Laid-Open No. ("JP") 2019-35781 discloses an imaging lens (optical system) that consists of positive, negative, negative, negative, and positive lenses arranged in this order from an object side to an image side.

In the optical system disclosed in JP 2019-35781, each of all lenses is made of an organic material (resin) has a linear expansion coefficient larger than that of an inorganic material (glass), and thus shows a large change in thickness and curvature, that is, a large change in aberration. An R1 surface of a first lens corresponds to a diaphragm (aperture stop) surface, and a light beam entering the first lens is thick. Moreover, when the temperature or humidity changes, due to the organic material, a change in spherical aberration and a change in coma are significant and become factors that reduce the imaging performance of an entire image. Furthermore, the first lens has a low refractive index, and thus a central or on-axis thickness becomes large and it is difficult to reduce the size of the optical system.

SUMMARY OF THE INVENTION

The present invention provides an optical system and an image pickup apparatus, each of which is small and lightweight, and has high performance.

An optical system according to one aspect of the present invention consists of a front unit and a rear unit. The front unit consists of a first lens having a positive refractive power, a second lens disposed on an image side of the first lens and having a positive refractive power, and a third lens. Each of the first lens and the second lens has a refractive index of 1.7 or higher for d-line. The rear unit consists of two or more and four or fewer lenses and includes a fourth lens having a positive refractive power and a fifth lens adjacent to the fourth lens and having a negative refractive power. Each of the fourth lens and the fifth lens is made of an organic material. The following conditional expressions are satisfied.

$$0.75 < vdA/vdB < 1.30$$

$$0.75 < -fA/fB < 1.30$$

where vdA is an Abbe number of the fourth lens, vdB is an Abbe number of the fifth lens, fA is a focal length of the fourth lens, and fB is a focal length of the fifth lens.

An image pickup apparatus according to another aspect of the present invention includes the above optical system, and an image sensor configured to image an optical image formed by the optical system.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

FIGS. 1, 3, 5, and 7 are sectional views of optical systems LO according to Examples 1 to 4 in an in-focus state at infinity (in-focus state on an infinity object), respectively. The optical system according to each example is an imaging optical system used for an image pickup apparatus such as a digital video camera, a digital still camera, a broadcasting camera, a film-based camera, and a surveillance camera. In each sectional view, a left side is an object side (front) and a right side is an image side (rear).

Figure 1:
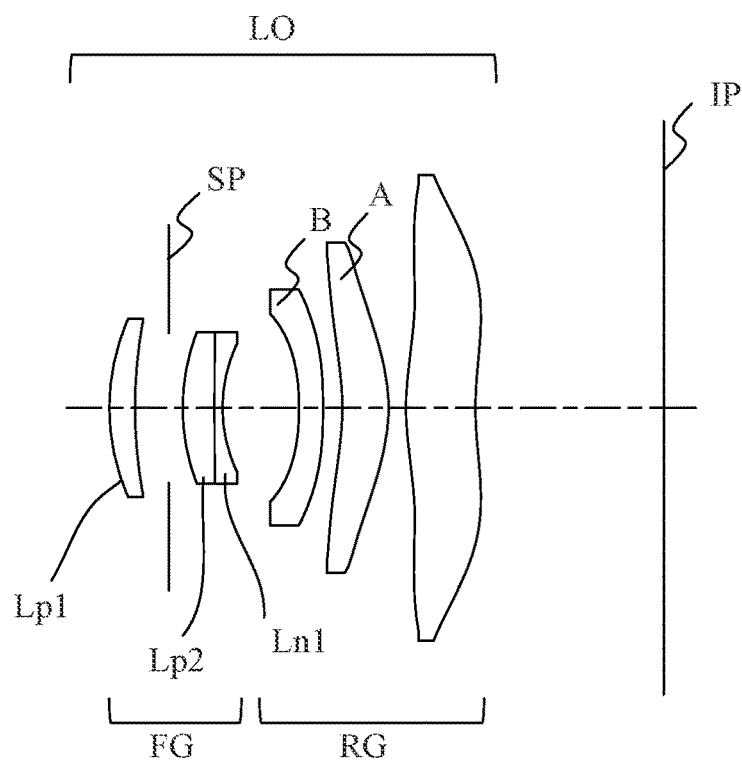
FIG. 1 is a sectional view of an optical system according to Example 1.
Figure 2:
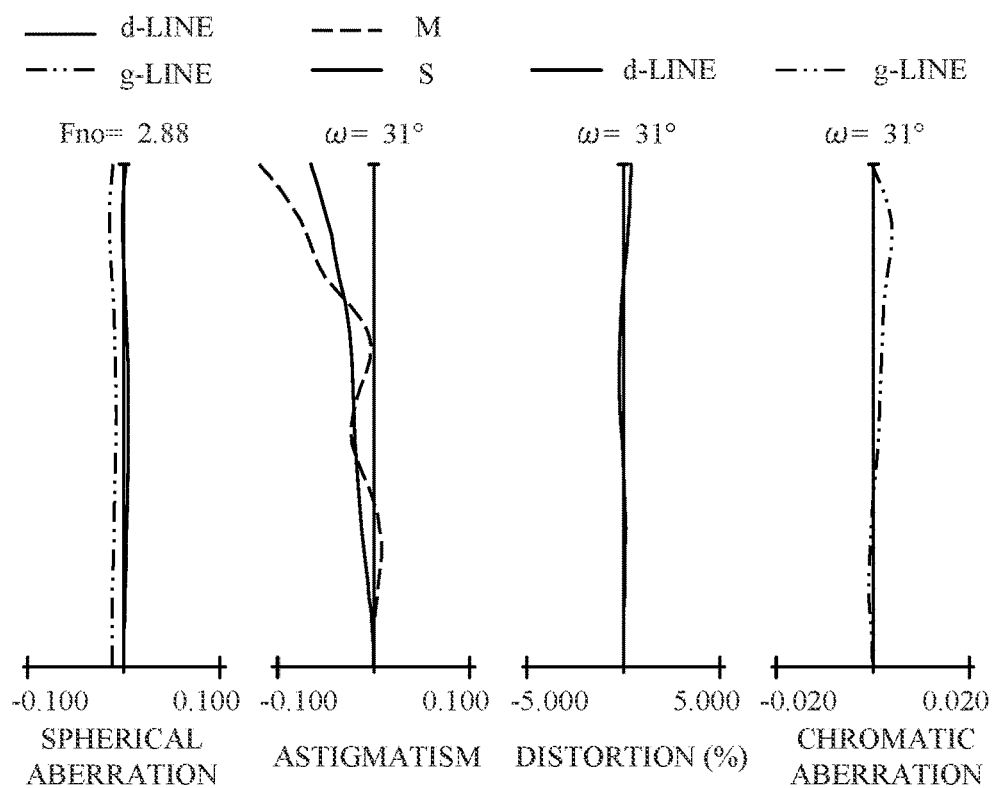
FIG. 2 is an aberration diagram of the optical system according to Example 1.

In FIG. 1. LO denotes the optical system (entire imaging optical system), FG denotes a front unit, and RG denotes a rear unit. In the rear unit RG, A denotes a lens (fourth lens) made of an organic material (resin) and having a positive refractive power, and B denotes a lens (fifth lens) made of an organic material (resin), having a negative refractive power, and adjacent to the lens A. SP denotes a diaphragm (aperture stop), and IP denotes an image plane. When an imaging optical system is used for a video camera or digital still camera, an imaging plane of a solid-state image sensor (photoelectric conversion element) such as a CCD sensor and CMOS sensor is placed on the image plane IP, and a photosensitive surface such as a film plane is disposed on the image plane IP when it is used for a film-based camera.

FIGS. 2, 4, 6, and 8 are aberration diagrams of the optical systems LO according to Examples 1 to 4, respectively, in the in-focus state at infinity. A spherical aberration diagram illustrates spherical aberration amounts for the d-line (wavelength 587.6 nm) and the g-line (wavelength 435.8 nm) where Fno is an F-number. In the astigmatism diagram, S denotes an astigmatism amount in a sagittal image plane, and M denotes an astigmatism amount in a meridional image plane. A distortion diagram illustrates a distortion amount for the d-line. A chromatic aberration diagram illustrates a chromatic aberration amount for the g-line. ω is an imaging half angle of view (degrees).

Referring now to FIG. 1, a description will be given of a configuration common to the optical systems according to each example. The optical system OL according to each example includes 5 or more and 7 or fewer lenses. Five or more lenses can satisfactorily suppress various aberrations. Seven or fewer lenses can realize the size and weight reductions. An element having no refractive power, such as flat glass, are not considered to be a component.

The optical system LO according to each example consists of the front unit FG and the rear unit RG. The front unit FG consists of three lenses, i.e., a lens (first lens) Lp1 having a positive refractive power, a lens (second lens) Lp2 having a positive refractive power, and a lens (third lens) Ln3 having a negative refractive power. The front unit FG may have at least two lenses each having positive refractive powers, and may include a lens having a positive refractive power as the third lens. In this disclosure, the first lens, the second lens, and the third lens do not necessarily have to be arranged in this order from the object side. The lens corresponding to the third lens may be closest to the object, or a lens corresponding to the third lens may be disposed between a lens corresponding to the first lens and a lens corresponding to the second lens. That is, unless otherwise specified, a condition that may be satisfied by the first lens described below may be satisfied by one of the positive lenses included in the front unit FG which is closest to the object rather than another positive lens closest to the image plane in the front unit FG. Unless otherwise specified, a condition that may be satisfied by the second lens described below may be satisfied by one of the positive lenses included in the front unit FG which is closest to the image plane rather than another positive lens closest to the object in the front unit FG.

Both of at least two lenses (first lens and second lens) having positive refractive powers in the front unit FG have refractive indexes of 1.7 or higher for the d-line. At least two lenses having positive refractive powers included in the front unit FG can guide a light beam to the rear unit RG while gently bending marginal light of an on-axis ray toward the convergent direction, achieving a telephoto structure (size reduction) and good imaging performance. Setting the refractive index of each of at least two lenses to 1.7 or higher can reduce the on-axis thickness of the lens and reduce the size of the imaging optical system LO.

The rear unit RG consists of two or more and four or fewer lenses and includes the lens A having the positive refractive power and the lens B adjacent to the lens A and having the negative refractive power. Each of the lenses A and B is made of an organic material. The lens A and the lens B satisfy the following conditional expressions (1) and (2):

$$0.75 < \nu dA/\nu dB < 1.30 \quad (1)$$

$$0.75 < -fA/fB < 1.30 \quad (2)$$

In the conditional expressions (1) and (2). $\nu dA$ is an Abbe number of the lens A having the positive refractive power, $\nu dB$ is an Abbe number of the lens B having the negative refractive power, fA is an Abbe number of the lens A having the positive refractive power, and fB is a focal length of the lens B having the negative optical power.

In particular, for a smaller wide-angle system in which the diaphragm SP is disposed in the front unit FG, the rear unit RG needs to be located at a position close to the image plane IP. Therefore, the rear unit RG is disposed at a position in which an off-axis light beam is high, and a diameter of the rear unit RG increases relative to the front unit FG. If the rear unit RG is made of an inorganic material (glass), the weight increases. The optical system according to each example is made lightweight by using the organic material (resin). Here, the organic material (resin) means a material having a linear expansion coefficient (/° C.) in a range of $5.0\times10^{-5}$ to $10.0\times10^{-5}$.

A ratio of the Abbe number of the lens A having the positive refractive power to the Abbe number of the lens B having the negative refractive power and an absolute value of a ratio of the focal lengths of the lenses A and B are set to numerical values including around 1 as in the conditional expressions (1) and (2), respectively. This configuration can suppress fluctuations in longitudinal and lateral chromatic aberrations when temperature or humidity changes. A detailed description will be given below.

Now assume that $h\_i$ is a height of an on-axis ray of an i-th lens from the optical axis in paraxial tracking, and $h\_bar\_i$ is a height of an off-axis principal ray of the i-th lens from the optical axis in the paraxial tracking. $\varphi\_i$ is a refractive power of the i-th lens in the paraxial tracking, and $\nu\_i$ is an Abbe number of the i-th lens in the paraxial tracking. At this time, a longitudinal chromatic aberration coefficient L and a lateral chromatic aberration coefficient T of the optical system are expressed by the following expressions (A) and (B).

$$L=\Sigma(h\_i \times h\_i \times \varphi\_i/\nu\_i) \quad (A)$$

$$T=\Sigma(h\_i \times h\_bar\_i \times \varphi\_i/\nu\_i) \quad (B)$$

It is understood from the expressions (A) and (B) that the longitudinal chromatic aberration is proportional to a square of the height $h\_i$, and the lateral chromatic aberration is proportional to the height $h\_i$ and the height $h\_bar\_i$. A longitudinal chromatic aberration amount $\Delta f$ and a lateral chromatic aberration amount $\Delta Y$ of the optical system are given by the following expressions (C) and (D).

$$\Delta f = -f \times L \quad (C)$$

$$\Delta Y = -Y \times T \quad (D)$$

In the expressions (C) and (D), f is a focal length of the optical system (entire system), and Y is an image height. That is, the longitudinal chromatic aberration coefficient L and the lateral chromatic aberration coefficient T of each lens are proportional to the refractive power and Abbe number of each lens.

Generally, the organic material has, when used, a linear expansion coefficient larger than that of the inorganic material, and thus a fluctuation in refractive power is significant when the temperature changes. That is, the organic material shows significant fluctuations in chromatic aberration. Accordingly, for the weight reduction and the fluctuation suppression of the chromatic aberration when the temperature changes, each of the lens having the positive refractive power and the lens having the negative refractive power that are adjacent to each other is made of the organic material, and the absolute value ratios of the Abbe numbers and powers (refractive powers) are set to values of around 1. Due to the adjacent lenses, the height of the on-axis ray from the optical axis and the height of the off-axis principal ray from the optical axis in the paraxial tracking of the lens having the positive refractive power and the lens having the negative refractive power have values relatively close to each other. By reversing signs of numerals of the refractive power and Abbe number and making them approximately equal to each other, the effect of canceling chromatic aberration at room temperature works. In addition, since the organic materials have similar Abbe numbers between the lens having the positive refractive power and the lens having the negative refractive power, their changes in the refractive power at each wavelength are approximately similar even when temperature changes, and changes in refractive power are approximately similar. Thus, the effect of canceling the chromatic aberration is maintained. This configuration can correct astigmatism and curvature of field by an aspherical effect of each lens while satisfactorily correcting chromatic aberration even when temperature changes, achieving high performance. The above configuration can realize a small, lightweight, high-performance optical system.

The numerical ranges of the conditional expressions (1) and (2) may be set as follows.

$$0.77 < vdA/vdB < 1.27 \quad (1A)$$

$$0.80 < -fA/fB < 1.25 \quad (2A)$$

The numerical ranges of the conditional expressions (1A) and (2A) may also be set as follows.

$$0.80 < vdA/vdB < 1.25 \quad (1B)$$

$$0.85 < -fA/fB < 1.20 \quad (2B)$$

The front unit FG may include a lens having a negative refractive power. This configuration can reduce a longitudinal chromatic aberration and Petzval sum (curvature of field), and achieve higher performance. The lens closest to the object in the front unit FG may have a positive refractive power. This configuration can make a telephoto structure, reduce the distance from the surface closest to the object to the imaging plane, and miniaturize the optical system.

The optical system according to each example may satisfy at least one of the following conditional expressions (3) to (20).

$$\alpha p1 < 100 \times 10^{-7} \quad (3)$$

$$25 < vdp1 < 60 \quad (4)$$

$$\alpha p2 < 100 \times 10^{-7} \quad (5)$$

$$25 < vdp2 < 60 \quad (6)$$

$$\alpha n < 100 \times 10^{-7} \quad (7)$$

$$1.60 < N < 2.10 \quad (8)$$

$$15 < vdn < 35 \quad (9)$$

$$1.4 < fA/f < 3.5 \quad (10)$$

$$1.00 < f/BF < N3.0 \quad (11)$$

$$0.5 < |Fu|/Fm < 25.0 \quad (12)$$

$$0.10 < dA/BF < 0.60 \quad (13)$$

$$0.05 < dB/BF < 0.40 \quad (14)$$

$$0.50 < du/BF < 1.50 \quad (15)$$

$$50 < vdA < 60 \quad (16)$$

$$1.45 < NA < 1.60 \quad (17)$$

$$15 < vdA < 40 \quad (18)$$

$$1.55 < NA < 1.75 \quad (19)$$

$$0.20 < -fn/f < 0.70 \quad (20)$$

Here, $\alpha p1$ is a linear expansion coefficient (/° C.) of the lens Lp1 having the positive refractive power and closest to the object in the front unit FG. vdp1 is an Abbe number of the lens Lp1. $\alpha p2$ is a linear expansion coefficient of the lens Lp2 having the positive refractive power and second closest to the object in the front unit FG. vdp2 is an Abbe number of the lens Lp2. $\alpha n$ is a linear expansion coefficient of the lens Ln1 having the negative refractive power in the front unit FG. N is a refractive index of the lens Ln1. vdn is an Abbe number of the lens Ln1. fA is a focal length of the lens A. f is a focal length of the optical system (entire system) LO. BF is a backfocus of the optical system LO (air equivalent length from a surface on the image side of the final lens to the image plane IP in the in-focus state at infinity). Fu is a focal length (combined focal length) of the rear unit RG. Fm is a focal length (combined focal length) of the front unit FG. dA is an on-axis thickness of the lens A. dB is an on-axis thickness of the lens B. du is an on-axis distance from a surface vertex closest to the object of the rear unit RG to a surface vertex closest to the image plane in the rear unit RG. vdA is an Abbe number of the lens A. NA is a refractive index of the lens A. vdB is an Abbe number of the lens B. NB is a refractive index of the lens B. fn is a focal length of a lens having a negative refractive power in the front unit FG.

A description will now be given of the technical meaning of each conditional expression.

The conditional expression (3) defines the linear expansion coefficient of the lens Lp1 having the positive refractive power and closest to the object in the front unit FG. If the value is higher than the upper limit of the conditional expression (3), the linear expansion coefficient becomes too large, and when temperature changes, aberration, in particular spherical aberration, is generated and deteriorates the imaging performance. Especially, when the front unit FG includes the diaphragm SP, on-axis and off-axis light beams become thick near the lens Lp1 having the positive refractive power and closest to the object in the front unit FG, and deteriorate the performance of the entire image. The linear expansion coefficient here indicates a value at a temperature of 25 degrees.

The conditional expression (4) defines the Abbe number of the lens Lp1 having the positive refractive power and closest to the object in the front unit FG. If the value is higher than the upper limit of the conditional expression (4), the longitudinal chromatic aberration of the F-line relative to the C-line becomes overcorrected. On the other hand, if the value is lower than the lower limit of the conditional expression (4), the longitudinal chromatic aberration of the F-line relative to the C-line becomes under-corrected.

The conditional expression (5) defines the linear expansion coefficient of the lens Lp2 having the positive refractive power and second closest to the object in the front unit FG. If the value is higher than the upper limit of the conditional expression (5), the linear expansion coefficient becomes too large, and when the temperature changes, the spherical aberration particularly occurs and deteriorates the imaging performance. Especially, in the configuration in which the diaphragm SP is included in the front unit FG, the on-axis and off-axis light beams become thick near the lens Lp2 having the positive refractive power and second closest to the object in the front unit FG, and deteriorate the performance of the entire image. The linear expansion coefficient here indicates a value at a temperature of 25 degrees.

The conditional expression (6) defines the Abbe number of the lens Lp2 having the positive refractive power and second closest to the object in the front unit FG. If the value is higher than the upper limit of the conditional expression (6), the longitudinal chromatic aberration of the F-line relative to the C-line becomes overcorrected. On the other hand, if the value is lower than the lower limit of the conditional expression (6), the longitudinal chromatic aberration of the F-line relative to the C-line becomes under-corrected.

The conditional expression (7) defines the linear expansion coefficient of the lens Ln1 having the negative refractive power in the front unit FG. If the value is higher than the upper limit of the conditional expression (7), the linear expansion coefficient becomes too large, and when the temperature changes, spherical aberration particularly occurs and deteriorates the imaging performance. Especially, in the configuration in which the diaphragm SP is included in the front unit FG, the on-axis and off-axis light beams become thick near the lens Ln1 having the negative refractive power in the front unit FG, and deteriorate the performance of the entire image. The linear expansion coefficient here indicates a value at a temperature of 25 degrees.

The conditional expression (8) defines the refractive index for the d-line of the lens Ln1 having the negative refractive power in the front unit FG. If the value is higher than the upper limit of the conditional expression (8), the refractive index is too large, the Petzval sum (curvature of field) becomes larger and deteriorates the imaging performance. On the other hand, if the value is lower than the lower limit of the conditional expression (8), the refractive index becomes too small, the curvature of the lens having the negative refractive power becomes large, the thickness in a thrust direction increases, and the size increases.

The conditional expression (9) defines the Abbe number of the lens Ln1 having the negative refractive power in the front unit FG. If the value is higher than the upper limit of the conditional expression (9), the longitudinal chromatic aberration of the F-line relative to the C-line becomes under-corrected. On the other hand, if the value is lower than the lower limit of the conditional expression (9), the longitudinal chromatic aberration of the F-line relative to the C-line becomes overcorrected.

The conditional expression (10) defines a ratio of the focal length of the lens A having the positive refractive power to the focal length of the optical system LO. If the value is higher than the upper limit of the conditional expression (10), the refractive power of the lens A becomes too small to satisfactorily correct, in particular, a curvature of field and astigmatism. On the other hand, if the value is lower than the lower limit of the conditional expression (10), the refractive power of the lens A becomes too large, and a changing amount of the refractive power when the temperature changes becomes too large, and fluctuations of, in particular, the curvature of field and astigmatism become too large.

The conditional expression (11) defines a ratio of the focal length of the optical system LO to the backfocus of the optical system LO in the in-focus state at infinity. If the value is higher than the upper limit of the conditional expression (11), the backfocus becomes too short, ghosts are likely to occur, and high performance cannot be achieved. In addition, an incident angle on the image sensor becomes too large around the periphery of the image, and color shading occurs. On the other hand, if the value is lower than the lower limit of the conditional expression (11), the backfocus becomes too long and the optical system LO becomes large.

The conditional expression (12) defines a ratio of an absolute value of the combined focal length of the rear unit RG to the combined focal length of the front unit FG. If the value is higher than the upper limit of the conditional expression (12), the combined focal length of the front unit FG becomes too short, the refractive power becomes too strong, and particularly spherical aberration and coma become excessive. On the other hand, if the value is lower than the lower limit of the conditional expression (12), the combined focal length of the rear unit RG becomes too short, the refractive power becomes too strong, and particularly astigmatism and curvature of field become excessive.

The conditional expression (13) defines a ratio of the on-axis thickness of the lens A having the positive refractive power to the backfocus. If the value is higher than the upper limit of the conditional expression (13), the on-axis thickness of the lens A becomes too large and the weight increases. On the other hand, if the value is lower than the lower limit of the conditional expression (13), the backfocus becomes too long, and the entire optical system LO becomes large.

The conditional expression (14) defines a ratio of the on-axis thickness of the lens B having a negative refractive power to the backfocus. If the value is higher than the upper limit of the conditional expression (14), the on-axis thickness of the lens B becomes too large and the weight increases. On the other hand, if the value is lower than the lower limit of the conditional expression (14), the backfocus becomes too long, and the entire optical system LO becomes large.

The conditional expression (15) defines a ratio of the on-axis distance from the surface vertex closest to the object to the surface vertex closest to the image plane of the rear unit RG to the backfocus. If the value is higher than the upper limit of the conditional expression (15), the rear unit RG becomes heavy. On the other hand, if the value is lower than the lower limit of the conditional expression (15), the backfocus becomes too long and the entire optical system LO becomes large.

The conditional expressions (16) and (17) define the Abbe number and the refractive index of the lens A having the positive refractive power, respectively. Maintaining the refractive index high and the Abbe number large within ranges that satisfy both the conditional expressions (16) and (17) can reduce the lateral chromatic aberration while reducing the Petzval sum (curvature of field).

The conditional expressions (18) and (19) define the Abbe number and the refractive index of the lens A having the positive refractive power, respectively. The conditional expressions (18) and (19) are to be satisfied when a higher-dispersion organic material than that of the conditional expressions (16) and (17) is used. In the conditional expressions (18) and (19), the Abbe number is smaller than that of the conditional expressions (16) and (17), the lateral chromatic aberration is not so good, but the refractive index can be made larger and thus the Petzval sum (curvature of field) can be made smaller.

The conditional expression (20) defines a ratio of the focal length of the lens Ln1 having the negative refractive power in the front unit FG to the focal length of the optical system LO. If the value is higher than the upper limit of the conditional expression (20), an absolute value of the focal length of the lens Ln1 becomes too large, spherical aberration is under-corrected, and the Petzval sum (curvature of field) increases. On the other hand, if the value is lower than the lower limit of the conditional expression (20), the absolute value of the focal length of the lens Ln1 becomes too small, the front principal point moves to the image side, the overall length becomes long, and the size increases.

The numerical ranges of the conditional expressions (3) to (20) may be set as follows.

$$\alpha p1 < 90 \times 10^{-7} \tag{3A}$$

$$27 < \nu dp1 < 55 \tag{4A}$$

$$\alpha p2 < 90 \times 10^{-7} \tag{5A}$$

$$30 < \nu dp2 < 55 \tag{6A}$$

$$\alpha n < 95 \times 10^{-7} \tag{7A}$$

$$1.65 < N < 2.05 \tag{8A}$$

$$16 < \nu dn < 32 \tag{9A}$$

$$1.5 < fA/f < 3.0 \tag{10A}$$

$$1.50 < f/BF < 2.90 \tag{11A}$$

$$0.7 < |Fu|/Fm < 21.0 \tag{12A}$$

$$0.12 < dA/BF < 0.50 \tag{13A}$$

$$0.08 < dB/BF < 0.35 \tag{14A}$$

$$0.55 < du/BF < 1.30 \tag{15A}$$

$$52 < \nu dA < 58 \tag{16A}$$

$$1.48 < NA < 1.58 \tag{17A}$$

$$17 < \nu dA < 30 \tag{18A}$$

$$1.60 < NA < 1.72 \tag{19A}$$

$$0.25 < -fn/f < 0.68 \tag{20A}$$

The numerical ranges of the conditional expressions (3A) to (20A) may also be set as follows.

$$\alpha p1 < 80 \times 10^{-7} \tag{3B}$$

$$30 < \nu dp1 < 50 \tag{4B}$$

$$\alpha p2 < 80 \times 10^{-7} \tag{5B}$$

$$35 < \nu dp2 < 50 \tag{6B}$$

$$\alpha n < 85 \times 10^{-7} \tag{7B}$$

$$1.73 < N < 200 \tag{8B}$$

$$17 < \nu dn < 28 \tag{9B}$$

$$1.6 < fA/f < 2.8 \tag{10B}$$

$$1.80 < f/BF < 2.85 \tag{11B}$$

$$0.9 < |Fu|/Fm < 17.0 \tag{12B}$$

$$0.15 < dA/BF < 0.45 \tag{13B}$$

$$0.10 < dB/BF < 0.30 \tag{14B}$$

$$0.60 < du/BF < 1.20 \tag{15B}$$

$$54 < \nu dA < 57 \tag{16B}$$

$$1.52 < NA < 1.56 \tag{17B}$$

$$19 < \nu dA < 25 \tag{18B}$$

$$1.62 < NA < 1.70 \tag{19B}$$

$$0.30 < -fn/f < 0.65 \tag{20B}$$

The above configuration can realize a small, lightweight, and high-performance imaging optical system. A specific description will be given of the optical systems LO according to Examples 1 to 4.

Example 1

Referring now to FIG. 1, a description will be given of the optical system LO according to Example 1. In the optical system LO according to this example, the front unit FG consists of three lenses, i.e., the lens Lp1 having the positive refractive power, the diaphragm (aperture stop) SP, the lens Lp2 having the positive refractive power, and the lens Ln1 having the negative refractive power arranged in order from the object side to the image side. This configuration can move the front principal point to the object side, and realizes the telephoto structure and miniaturization. In addition, each lens is made of an inorganic material. In the front unit FG, the on-axis and off-axis light beams are so thick that spherical aberration and coma are significantly changed when the curvature and the thickness are changed, and thus these light beams affect the imaging performance of the entire image. Using the front unit FG made of the inorganic material can restrain the curvature, thickness, and refractive index from changing when the temperature changes, and improve the imaging performance of the entire image.

The rear unit RG consists of three lenses, i.e., the lens B having the negative refractive power, the lens A having the positive refractive power, and a lens having a positive refractive power, arranged in this order from the object side to the image side. An inverted arrangement of the front unit FG with respect to lenses having positive, positive, and negative refractive powers can provide a symmetrical (concentric) shape, and satisfactorily correct off-axis aberration. While the diameter of the rear unit RG is as large as that of the sensor, all the lenses are made of the organic materials, so that the weight can be reduced. Moreover, since the lens B having the negative refractive power and the lens A having the positive refractive power that are adjacent to each other satisfy the conditional expressions (1) and (2), a fluctuation of chromatic aberration when temperature changes can be satisfactorily corrected. Satisfying the conditional expressions (3) to (20) can provide a small, lightweight, and high-performance optical system.

Example 2

Figure 3:
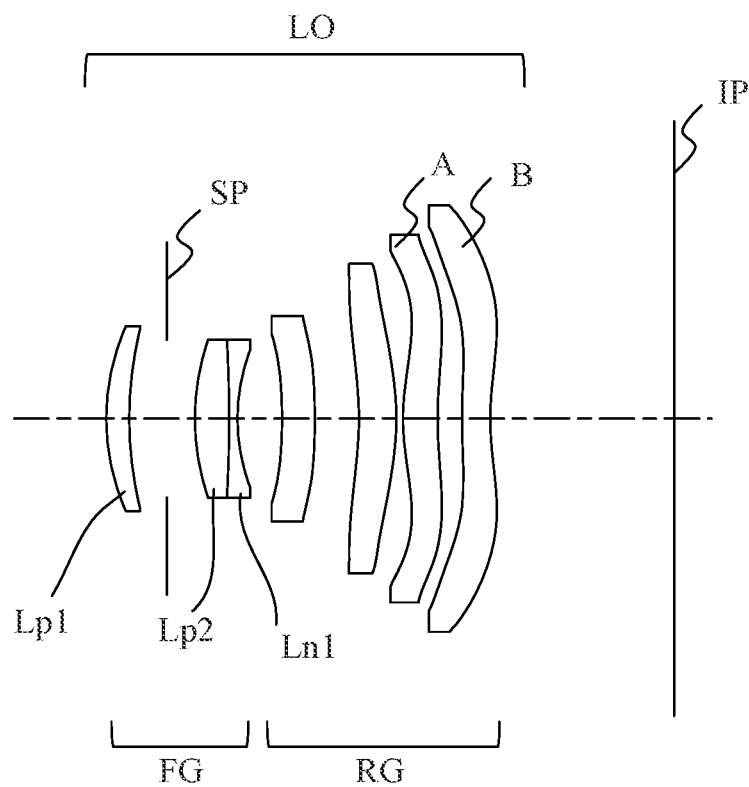
FIG. 3 is a sectional view of an optical system according to Example 2.
Figure 4:
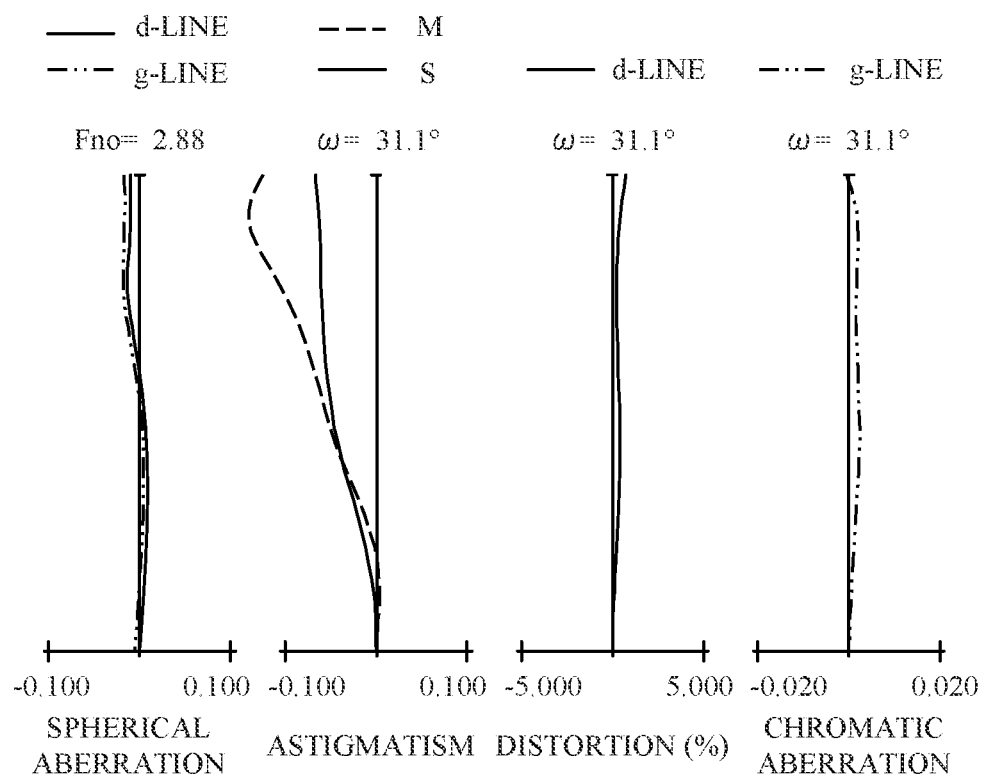
FIG. 4 is an aberration diagram of the optical system according to Example 2.

Referring now to FIG. 3, a description will be given of the optical system LO according to Example 2. In this and subsequent embodiments, a description common to Example 1 will be omitted. The rear unit RG consists of four lenses, i.e., lenses having negative, positive, positive, and negative refractive powers arranged in order from the object side to the image side. The rear unit RG consisting of four lenses can satisfactorily correct, in particular, astigmatism and curvature of field. Moreover, the two lenses (negative lens and positive lens) on the object side of the rear unit RG are paired, the two lenses (lens A and lens B) on the image side are paired, and each pair satisfies the conditional expressions (1) and (2). This configuration can satisfactorily correct chromatic aberration when temperature changes between the pairs of lenses, and suppress the fluctuation of the chromatic aberration as a whole. Satisfying the conditional expressions (3) to (20) can provide a small, lightweight, and high-performance optical system.

Example 3

Figure 5:
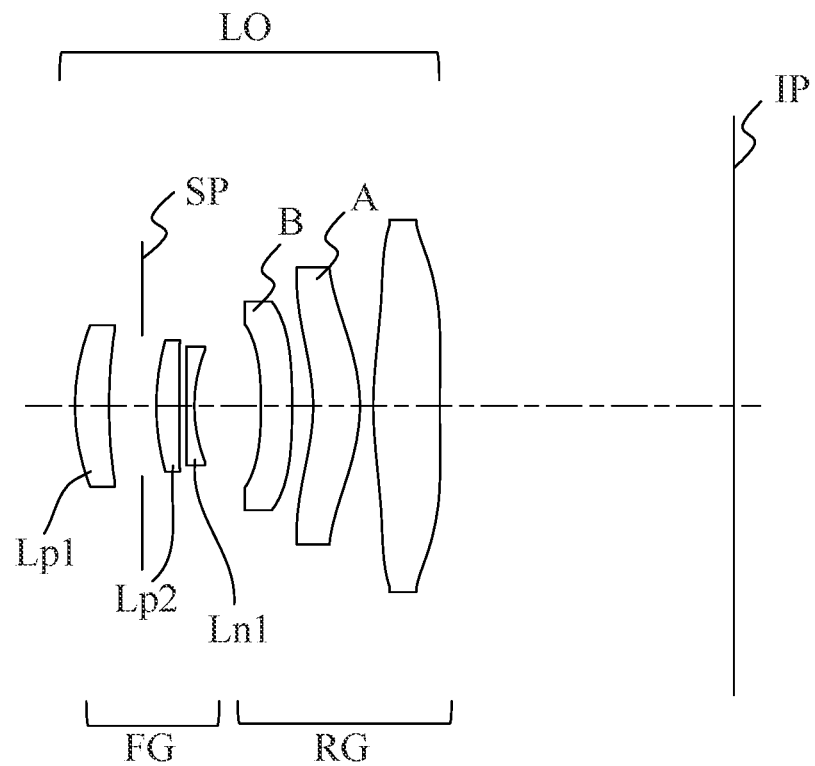
FIG. 5 is a sectional view of an optical system according to Example 3.
Figure 6:
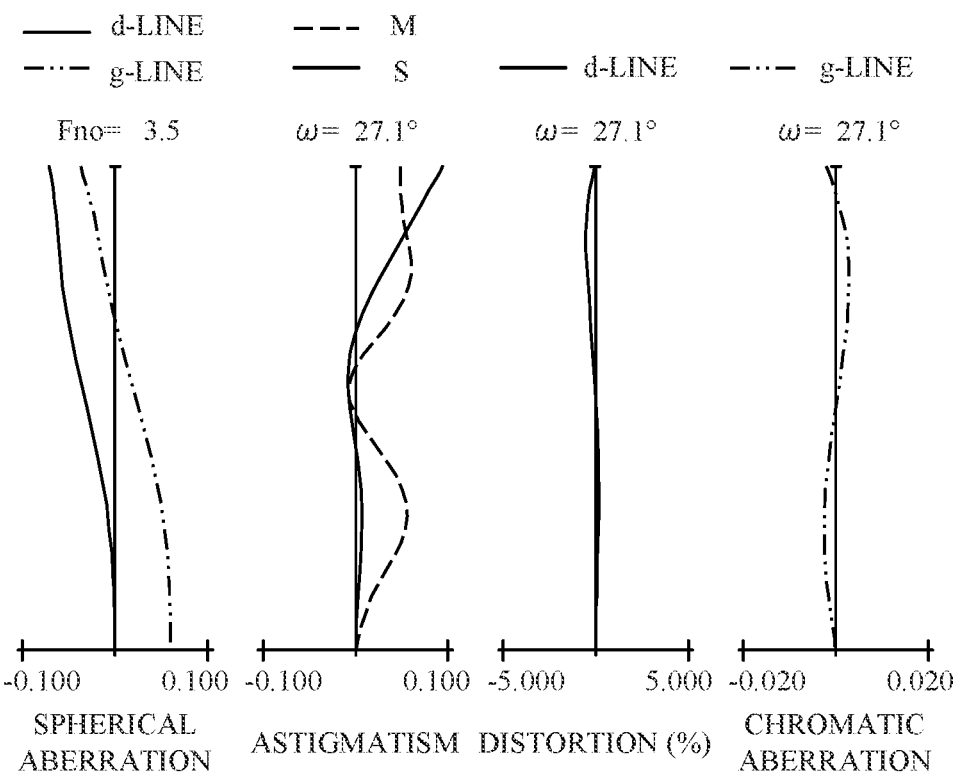
FIG. 6 is an aberration diagram of the optical system according to Example 3.

Referring now to FIG. 5, a description will be given of the optical system LO according to Example 3. In the optical system LO according to this example, the refractive power of the front unit FG and the refractive power of the rear unit RG are made approximately equal to each other so as to properly distribute the refractive power. This configuration can suppress bending of a light ray emitted from the front unit FG relative to a light ray incident on the front unit FG, and reduce, in particular, spherical aberration and coma. Moreover, satisfying the conditional expressions (1) to (20) can provide a compact, lightweight, and high-performance imaging optical system.

Example 4

Figure 7:
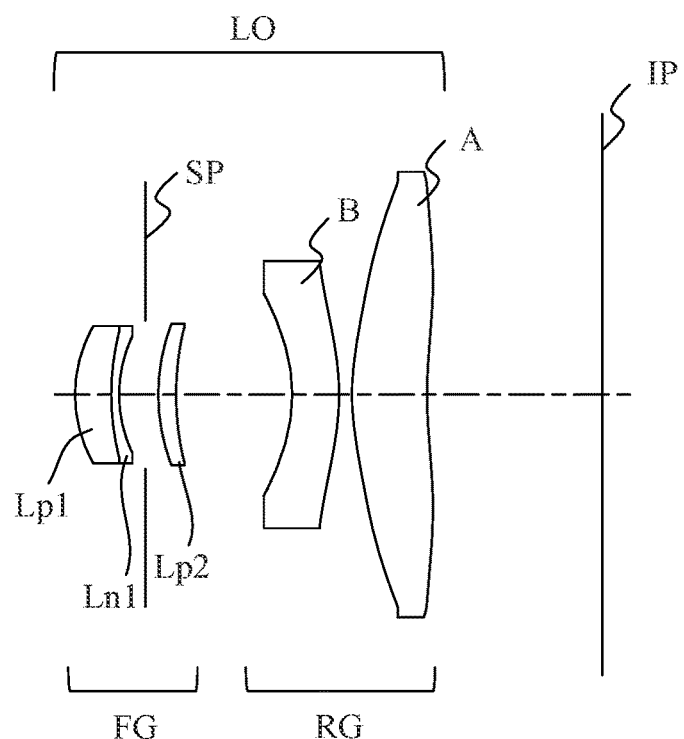
FIG. 7 is a sectional view of an optical system according to Example 4.
Figure 8:
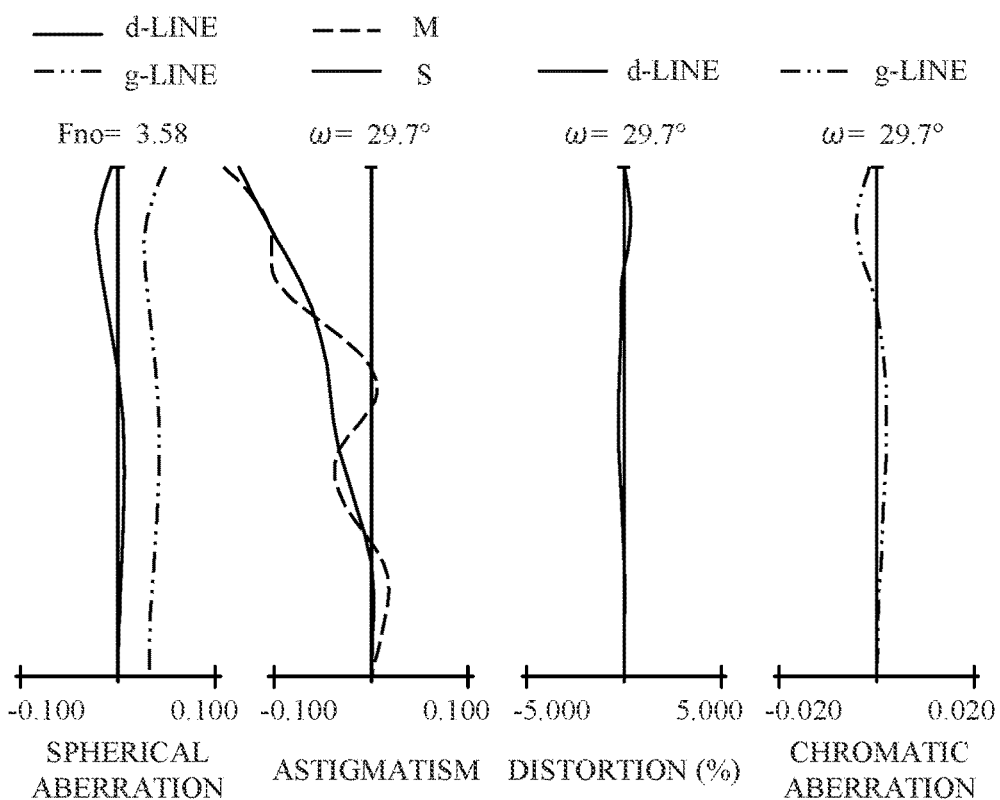
FIG. 8 is an aberration diagram of the optical system according to Example 4.

Referring now to FIG. 7, a description will be given of the optical system LO according to Example 4. The front unit FG consists of three lenses, i.e., the lens Lp1 having the positive refractive power, the lens Ln1 having the negative refractive power, the diaphragm SP, and the lens Lp2 having the positive refractive power arranged in this order from the object side to the image side. Disposing the lens Ln1 closer to the object than that of Example 1 can more satisfactorily correct longitudinal chromatic and spherical aberrations.

The rear unit RG consists of two lenses, i.e., the lens B having the negative refractive power and the lens A having the positive refractive power arranged in this order from the object side to the image side. This two-lens configuration can be lighter than the configuration of Example 1. Moreover, satisfying the conditional expressions (1) to (20) can provide a small, lightweight, and high-performance imaging optical system.

Figure 9:
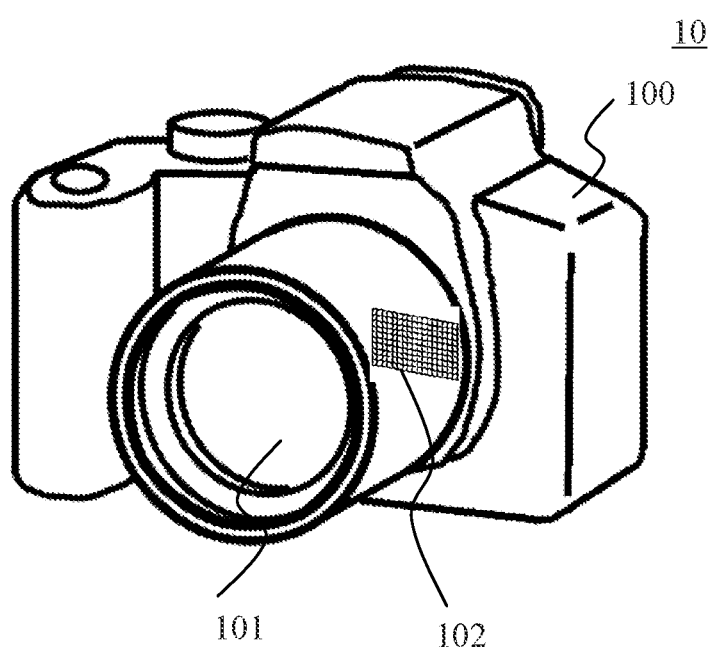
FIG. 9 is a schematic view of an image pickup apparatus that includes an optical system according to each embodiment.

Referring now to FIG. 9, a description will be given of an image pickup apparatus using the optical system LO according to each example as an imaging optical system. FIG. 9 is a schematic view of an image pickup apparatus (digital camera) 10. In FIG. 9, reference numeral 100 denotes a camera body (image pickup apparatus body), and reference numeral 101 denotes an imaging optical system corresponding to the optical system LO according to each example. Reference numeral 102 denotes an image sensor (photoelectric conversion element) for receiving (imaging) an object image (optical image) formed by the imaging optical system 101. The image pickup apparatus 10 includes an unillustrated display unit such as a liquid crystal panel, which displays the object image formed on the image sensor 102.

Applying the optical system LO according to each example in this way can provide an image pickup apparatus having a high optical performance.

Next follow numerical examples 1 to 4 corresponding to Examples 1 to 4, respectively. In surface data in each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index of each optical element for the d-line, and νd represents an Abbe number of the optical element. The Abbe number νd of a certain material is expressed as follows:

$$\nu d = (Nd-1)/(NF-NC)$$

where Nd, NF, and NC are refractive indexes for the d-line (587.6 nm), F-line (486.1 nm), and C-line (656.3 nm) in the Fraunhofer line.

In each numerical example, d, a focal length (mm), an F-number, and a half angle of view (degrees) are given by values when the optical system according to each example is in an in-focus state on an infinity object. BF (backfocus) is a distance on the optical axis from the final lens surface (closest to the image plane) of the optical system to a paraxial image plane in terms of an air equivalent length. An overall lens length is a length obtained by adding the backfocus to a distance on the optical axis from the frontmost lens surface (closest to the object) of the optical system to the final surface of the lens. A lens unit may include one or more lenses.

If an optical surface is aspherical, a sign * is attached to a right side of a surface number. The aspherical surface shape is expressed as follows:

$$x = \frac{h^2/R}{1+\sqrt{1-(1+k)(h/R)^2}} + A4 \times h^4 + A6 \times h^6 + A8 \times h^8 + A10 \times h^{10}$$

where x is a displacement amount from a surface vertex in the optical axis direction, h is a height from the optical axis in a direction orthogonal to the optical axis, R is a paraxial radius of curvature, k is a conical constant, and A4, A6, A8, and A10 are aspherical coefficients of each order. "e±XX" in each aspherical coefficient means "×10$^{\pm XX}$."

NUMERICAL EXAMPLE 1
UNIT: mm

Surface Data

| Surface No. | r | d | nd | νd | Effective Diameter |
|---|---|---|---|---|---|
| 1 | 6.027 | 0.71 | 1.80400 | 46.5 | 4.56 |
| 2 | 13.112 | 0.91 | | | 4.41 |
| 3(Diaphragm) | ∞ | 0.39 | | | 4.13 |
| 4 | 5.762 | 0.88 | 1.90043 | 37.4 | 3.87 |
| 5 | 276.886 | 0.22 | 1.76182 | 26.5 | 3.57 |
| 6 | 4.087 | 2.12 | | | 3.28 |
| 7* | −8.544 | 0.66 | 1.67070 | 19.3 | 4.78 |
| 8* | −25.539 | 0.54 | | | 6.02 |
| 9* | −7.071 | 1.28 | 1.63560 | 23.9 | 7.73 |
| 10* | −5.018 | 0.48 | | | 8.42 |
| 11* | 7.499 | 1.90 | 1.53500 | 56.0 | 11.27 |
| 12* | 9.164 | | | | 11.82 |
| Image Plane | ∞ | | | | |

-continued

NUMERICAL EXAMPLE 1
UNIT: mm

ASPHERIC DATA

7th Surface
$K = 0.00000e+000$ $A 4 = -1.30571e-002$ $A 6 = 1.07357e-003$ $A 8 = 1.13910e-006$
$A10 = -3.23336e-006$ $A12 = -1.01049e-006$ 8th Surface
$K = 0.00000e+000$ $A 4 = -1.05055e-002$ $A 6 = 1.04691e-003$ $A 8 = -3.89159e-005$
$A10 = -5.44432e-007$ $A12 = 2.59956e-008$ 9th Surface
$K = 0.00000e+000$ $A 4 = 8.11468e-003$ $A 6 = -6.75729e-004$ $A 8 = 3.07488e-005$
$A10 = -1.29401e-007$ $A12 = -2.06278e-008$ 10th Surface
$K = 0.00000e+000$ $A 4 = 3.89314e-003$ $A 6 = 1.26901e-004$ $A 8 = -2.57098e-005$
$A10 = 1.67415e-006$ $A12 = -3.50220e-008$ 11th Surface
$K = 0.00000e+000$ $A 4 = -6.73863e-003$ $A 6 = 2.57932e-004$ $A 8 = -4.04258e-006$
$A10 = -1.83896e-008$ $A12 = 1.37821e-009$ $A14 = -1.37275e-011$ 12th Surface
$K = 0.00000e+000$ $A 4 = -6.31402e-003$ $A 6 = 2.43612e-004$ $A 8 = -8.06405e-006$
$A10 = 1.82462e-007$ $A12 = -2.06718e-009$ $A14 = 7.83470e-012$

ZOOM RATIO

| | |
|---|---|
| ZOOM RATIO | 1.00 |
| Focal Length: | 13.12 |
| FNO | 2.88 |
| Half Angle of View: | 31.02 |
| Image Height | 7.89 |
| Overall lens length | 15.26 |
| BF | 5.19 |
| d12 | 5.19 |
| Entrance Pupil Position | 1.51 |
| Exit Pupil Position | -7.70 |
| Front Principal Point Position | 1.27 |
| Rear Principal Point Position | -7.93 |

Single Lens Data

| Lens | Starting Surface | Focal Length |
|---|---|---|
| 1 | 1 | 13.28 |
| 2 | 4 | 6.52 |
| 3 | 5 | -5.45 |
| 4 | 7 | -19.45 |
| 5 | 9 | 21.91 |
| 6 | 11 | 55.22 |

NUMERICAL EXAMPLE 2
UNIT: mm

Surface Data

| Surface No. | r | d | nd | vd | Effective Diameter |
|---|---|---|---|---|---|
| 1 | 6.021 | 0.61 | 1.81600 | 46.6 | 4.55 |
| 2 | 9.865 | 1.00 | | | 4.40 |
| 3(Diaphragm) | ∞ | 0.75 | | | 4.19 |
| 4 | 6.384 | 0.91 | 1.90043 | 37.4 | 3.89 |
| 5 | -35.714 | 0.22 | 1.75211 | 25.0 | 3.64 |
| 6 | 5.076 | 1.18 | | | 3.37 |
| 7 | -16.521 | 0.87 | 1.65010 | 21.5 | 4.17 |
| 8* | -21.442 | 1.18 | | | 5.05 |
| 9* | -7.208 | 0.99 | 1.63560 | 23.9 | 7.03 |
| 10* | -6.993 | 0.17 | | | 7.61 |
| 11* | 5.928 | 0.92 | 1.53 HO | 55.9 | 8.26 |
| 12* | 11.152 | 0.65 | | | 9.04 |
| 13* | 16.662 | 0.75 | 1.53500 | 56.0 | 9.47 |
| 14* | 7.305 | | | | 10.33 |
| Image Plane | ∞ | | | | |

-continued

NUMERICAL EXAMPLE 2
UNIT: mm

ASPHERIC DATA

7th Surface
K = 0.00000e+000 A 4 = −6.66583e−003 A 6 = 9.69171e−004 A 8 = −4.03272e−004
A10 = 8.79337e−005 A12 = −6 17014e−006
8th Surface
K = 0.00000e+000 A 4 = −4.77623e−003 A 6 = 4.25204e−004 A 8 = −1.64811e−004
A10 = 3.15736e−005 A12 = −1.59846e−006
9th Surface
K = −1.41036e+001 A 4 = 8.94812e−003 A 6 = −1.68586e−003 A 8 = 1.57237e−004
A10 = −6.42994e−006 A12 = 8.59335e−008
10th Surface
K = −4.59613e+000 A 4 = 5.05734e−003 A 6 = −7.80669e−004 A 8 = 6.43193e−005
A10 = −2.10462e−006 A12 = 1.30611e−008
11th Surface
K = 0.00000e+000 A 4 = −1.05053e−002 A 6 = 4.81059e−004 A 8 = −1.61741e−005
A10 = −3.75795e−007 A12 = 4.18961e−008 A14 = −7.14086e−010
12th Surface
K = 0.00000e+000 A 4 = −5.20687e−003 A 6 = 1.44080e−004 A 8 = −1.64974e−006
A10 = −2.80569e−007 A12 = 1.62436e−008 A14 = −2.08518e−010
13th Surface
K = 0.00000e+000 A 4 = −6.27407e−003 A 6 = 9.12346e−005 A 8 = 8.33783e−006
A10 = −2.48711e−007 A12 = −1.08995e−009 A14 = 5.50477e−011
14th Surface
K = 0.00000e+000 A 4 = −8.64112e−003 A 6 = 3.52520e−004 A 8 = −1.18418e−005
A10 = 2.99352e−007 A12 = −4.50466e−009 A14 = 2.14589e−011

ZOOM RATIO

| | |
|---|---|
| ZOOM RATIO | 1.00 |
| Focal Length: | 13.09 |
| FNO | 2.88 |
| Half Angle of View: | 31.08 |
| Image Height | 7.89 |
| Overall lens length | 15.08 |
| BF | 4.88 |
| d14 | 4.88 |
| Entrance Pupil Position | 1.51 |
| Exit Pupil Position | −6.27 |
| Front Principal Point Position | −0.76 |
| Rear Principal Point Position | −8.21 |

Single Lens Data

| Lens | Starting Surface | Focal Length: |
|---|---|---|
| 1 | 1 | 17.67 |
| 2 | 4 | 6.08 |
| 3 | 5 | −5.90 |
| 4 | 7 | −119.01 |
| 5 | 9 | 132.23 |
| 6 | 11 | 22.46 |
| 7 | 13 | −25.02 |

NUMERICAL EXAMPLE 3
UNIT: mm

Surface Data

| Surface No. | r | d | nd | vd | Effective Diameter |
|---|---|---|---|---|---|
| 1 | 6.027 | 0.92 | 1.91082 | 35.3 | 4.41 |
| 2 | 13.112 | 0.91 | | | 4.16 |
| 3(Diaphragm) | ∞ | 0.39 | | | 3.86 |
| 4 | 6.564 | 0.64 | 1.77250 | 49.6 | 3.60 |
| 5 | 276.886 | 0.18 | | | 3.41 |
| 6 | 276.886 | 0.22 | 1.80810 | 22.8 | 3.25 |
| 7 | 4.087 | 1.82 | | | 3.01 |
| 8* | −12.997 | 0.85 | 1.63560 | 23.9 | 4.45 |
| 9* | −25.539 | 0.57 | | | 5.70 |
| 10* | −5.176 | 1.28 | 1.67070 | 19.3 | 6.83 |
| 11* | −4.825 | 0.36 | | | 7.57 |

-continued

NUMERICAL EXAMPLE 3
UNIT: mm

| | | | | | |
|---|---|---|---|---|---|
| 12* | 10.575 | 1.82 | 1.53500 | 56.0 | 9.85 |
| 13* | 41.456 | | | | 10.16 |
| Image Plane | ∞ | | | | |

ASPHERIC DATA

8th Surface
K = 0.00000e+000 A 4 = −8.23905e−003 A 6 = −1.85106e−004 A 8 = −2.80429e−004
A10 = 1.33504e−004 A12 = −1.72217e−005
9th Surface
K = 0.00000e+000 A 4 = −5.05212e−003 A 6 = −3.36300e−004 A 8 = 6.08201e−005
A10 = 9.33005e−007 A12 = −6.60549e−007
10th Surface
K = 0.00000e+000 A 4 = 8.48361e−003 A 6 = −2.49024e−004 A 8 = −2.47053e−006
A10 = 8.63458e−007 A12 = −2.45232e−008
11th Surface
K = 0.00000e+000 A 4 = 3.76269e−003 A 6 = 1.03039e−004 A 8 = −2.36342e−006
A10 = −3.45118e−008 A12 = 5.29686e−009
12th Surface
K = 0.00000e+000 A 4 = −3.67350e−003 A6 = 1.30651e−004 A 8 = −1.97917e−006
A10 = 1.19013e−008 A12 = 8.59667e−010 A14 = −1.37275e−011
13th Surface
K = 0.00000e+000 A 4 = −2.93441e−003 A 6 = 6.87192e−005 A 8 = −7.91416e−007
A10 = −3.13873e−008 A12 = 1.57545e−009 A14 = 7.83470e−012

ZOOM RATIO

| | |
|---|---|
| ZOOM RATIO | 1.00 |
| Focal Length: | 15.44 |
| FNO | 3.50 |
| Half Angle of View: | 27.07 |
| Image Height | 7.89 |
| Overall lens length | 18.00 |
| BF | 8.03 |
| d13 | 8.03 |
| Entrance Pupil Position | 1.68 |
| Exit Pupil Position | −9.29 |
| Front Principal Point Position | 3.36 |
| Rear Principal Point Position | −7.41 |

Single Lens Data

| Lens | Starting Surface | Focal Length |
|---|---|---|
| 1 | 1 | 11.53 |
| 2 | 4 | 8.69 |
| 3 | 6 | −5.14 |
| 4 | 8 | −42.76 |
| 5 | 10 | 43.11 |
| 6 | 12 | 26.00 |

NUMERICAL EXAMPLE 4
UNIT: mm

Surface Data

| Surface No. | r | d | nd | vd | Effective Diameter |
|---|---|---|---|---|---|
| 1 | 3.882 | 1.02 | 1.95375 | 32.3 | 3.87 |
| 2 | 7.138 | 0.22 | 1.94594 | 18.0 | 3.57 |
| 3 | 3.795 | 0.74 | | | 3.28 |
| 4(Diaphragm) | ∞ | 0.36 | | | 4.18 |
| 5* | 5.552 | 0.50 | 1.76450 | 49.1 | 3.98 |
| 6* | 8.765 | 3.27 | | | 3.81 |
| 7* | −4.324 | 1.31 | 1.54390 | 56.0 | 5.69 |
| 8* | −7.294 | 0.36 | | | 7.51 |
| 9* | 7.042 | 2.11 | 1.54390 | 56.0 | 12.02 |
| 10* | 11.987 | | | | 12.52 |
| Image Plane | ∞ | | | | |

-continued

NUMERICAL EXAMPLE 4
UNIT: mm

ASPHERIC DATA

5th Surface
K = 0.00000e+000 A 4 = 2.81554e-005 A 6 = 1.84850e-004 A 8 = -3.15509e-005
6th Surface
K = 0.00000e-000 A 4 = 1.44367e-003 A 6 = 1.74832e-004 A 8 = -7.82800e-006
7th Surface
K = 0.00000e+000 A 4 = 7.70082e-003 A 6 = -1.14006e-003 A 8 = 1.49727e-004
A10 = -1.18323e-005 A12 = 4.67624e-007 A14 = -3.71569e-010
8th Surface
K = 0.00000e+000 A 4 = 4.07615e-003 A 6 = -5.26957e-004 A 8 = 7.96433e-005
A10 = -6.17853e-006 A12 = 2.32990e-007 A14 = -3.35783e-009
9th Surface
K = 0.00000e+000 A 4 = -5.14713e-003 A 6 = 3.05044e-004 A 8 = -1.15182e-005
A10 = 2.36679e-007 A12 = -2.10950e-009
10th Surface
K= 0.00000e+000 A 4 = -3.90330e-003 A 6 = 1.84171e-004 A 8 = -6.54476e-006
A10 = 1.46975e-007 A12 = -1.40581e-009

ZOOM RATIO

| | |
|---|---|
| ZOOM RATIO | 1.00 |
| Focal Length: | 13.83 |
| FNO | 3.58 |
| Half Angle of View: | 29.71 |
| Image Height | 7.89 |
| Overall lens length | 14.82 |
| BF | 4.92 |
| d10 | 4.92 |
| Entrance Pupil Position | 1.82 |
| Exit Pupil Position | -6.69 |
| Front Principal Point Position | -0.82 |
| Rear Principal Point Position | -8.90 |

Single Lens Data

| Lens | Starting Surface | Focal Length: |
|---|---|---|
| 1 | 1 | 7.74 |
| 2 | 2 | -8.85 |
| 3 | 5 | 18.55 |
| 4 | 7 | -23.11 |
| 5 | 9 | 27.29 |

Table 1 illustrates a value of each conditional expression in each numerical example.

TABLE 1

| CONDITIONAL EXPRESSION | EXAMPLE 1 | EXAMPLE 2 | EXAMPLE 3 | EXAMPLE 4 |
|---|---|---|---|---|
| (1) $0.75 < vdA/vdB < 1.30$ | 1.24 | 1.00 | 0.81 | 1.00 |
| (2) $0.75 < -fA/fB < 1.30$ | 1.13 | 0.90 | 1.01 | 1.18 |
| (3) $\alpha 1 < 100 \times 10^{-7}$ | $61 \times 10^{-7}$ | $63 \times 10^{-7}$ | $68 \times 10^{-7}$ | $70 \times 10^{-7}$ |
| (4) $25 < vdp1 < 60$ | 46.53 | 46.62 | 35.25 | 32.32 |
| (5) $\alpha p2 < 100 \times 10^{-7}$ | $70 \times 10^{-7}$ | $70 \times 10^{-7}$ | $56 \times 10^{-7}$ | $57 \times 10^{-7}$ |
| (6) $25 < vdp2 < 60$ | 37.37 | 37.37 | 49.63 | 49.07 |
| (7) $\alpha n < 100 \times 10^{-7}$ | $87 \times 10^{-7}$ | $61 \times 10^{-7}$ | $83 \times 10^{-7}$ | $54 \times 10^{-7}$ |
| (8) $1.60 < N < 2.10$ | 1.76 | 1.75 | 1.81 | 1.98 |
| (9) $15 < vdn < 35$ | 26.52 | 25.05 | 22.76 | 17.98 |
| (10) $1.4 < fA/f < 3.5$ | 1.67 | 1.72 | 2.79 | 1.97 |
| (11) $1.0 < f/BF < 3.0$ | 2.53 | 2.68 | 1.92 | 2.81 |
| (12) $0.5 < |Fu|/Fm < 25.0$ | 3.09 | 6.86 | 0.95 | 16.27 |
| (13) $0.10 < dA/BF < 0.60$ | 0.25 | 0.19 | 0.16 | 0.43 |
| (14) $0.05 < dB/BF < 0.40$ | 0.13 | 0.15 | 0.11 | 0.27 |
| (15) $0.50 < du/BF < 1.50$ | 0.93 | 1.13 | 0.61 | 0.77 |
| (16) $50 < vdA < 60$ | — | 55.91 | — | 56.00 |
| (17) $1.45 < NA < 1.60$ | — | 1.53 | — | 1.54 |
| (18) $15 < vdA < 40$ | 23.90 | — | 19.30 | — |
| (19) $1.55 < NA < 1.75$ | 1.64 | — | 1.67 | — |
| (20) $0.20 < -fn/f < 0.70$ | 0.42 | 0.45 | 0.33 | 0.54 |

Each example can provide an optical system and an image pickup apparatus, each of which is small and lightweight and has high performance.

While the present invention has been described with reference to exemplary examples, it is to be understood that the invention is not limited to the disclosed exemplary embodiments. The scope of the following claims is to be accorded the broadest interpretation so as to encompass all such modifications and equivalent structures and functions.

For example, the diaphragm SP may be disposed closest to the object to form a front diaphragm configuration. Alternatively, the diaphragm SP may be disposed closest to the image plane in the front unit FG. Moreover, in a case where the optical system is combined with an image pickup apparatus that includes an image sensor that converts an optical image formed on a light-receiving surface into an electric signal, electrical correction may be added depending on a distortion amount and a lateral chromatic aberration amount. Further, the F-number (aperture value) may be adjusted by the diaphragm SP.

This application claims the benefit of Japanese Patent Application No. 2021-085396, filed on May 20, 2021, which is hereby incorporated by reference herein in its entirety.

What is claimed is:

1. An optical system consisting of a front unit and a rear unit,
wherein the front unit consists of:
a first lens having a positive refractive power;
a second lens disposed on an image side of the first lens and having a positive refractive power; and
a third lens,
wherein each of the first lens and the second lens has a refractive index of 1.7 or higher for d-line,
wherein the rear unit consists of two or more and four or fewer lenses and includes a fourth lens having a positive refractive power and a fifth lens adjacent to the fourth lens and having a negative refractive power,
wherein each of the fourth lens and the fifth lens is made of an organic material, and
wherein the following inequalities are satisfied:

$$0.75 < vdA/vdB < 1.30$$

$$0.75 < -fA/fB < 1.30$$

$$0.50 < du/BF < 1.50$$

where vdA is an Abbe number of the fourth lens, vdB is an Abbe number of the fifth lens, fA is a focal length of the fourth lens, fB is a focal length of the fifth lens, du is an on-axis distance from a surface vertex closest to an object to a surface vertex closest to an image plane of the rear unit, and BF is a backfocus of the optical system.

2. The optical system according to claim 1, wherein the following inequalitys is satisfied:

$$\alpha p1 < 100 \times 10^{-7}$$

where $\alpha p1$ is a linear expansion coefficient (/° C.) of the first lens.

3. The optical system according to claim 1, wherein the following inequalitys is satisfied:

$$25 < vdp1 < 60$$

where vdp1 is an Abbe number of the first lens.

4. The optical system according to claim 1, wherein the following inequalitys expression is satisfied:

$$\alpha p2 < 100 \times 10^{-7}$$

where $\alpha p2$ is a linear expansion coefficient (/° C.) of the second lens.

5. The optical system according to claim 1, wherein the following inequalitys is satisfied:

$$25 < vdp2 < 60$$

where vdp2 is an Abbe number of the second lens.

6. The optical system according to claim 1, wherein the third lens has a negative refractive power.

7. The optical system according to claim 6, wherein the following inequalitys is satisfied:

$$\alpha n < 100 \times 10^{-7}$$

where $\alpha n$ is a linear expansion coefficient (/° C.) of the third lens.

8. The optical system according to claim 6, wherein the following inequalitys is satisfied:

$$1.60 < N < 2.10$$

where N is a refractive index of the third lens.

9. The optical system according to claim 6, wherein the following inequalitys is satisfied:

$$15 < vdn < 35$$

where vdn is an Abbe number of the third lens.

10. The optical system according to claim 1, wherein the following inequalitys is satisfied:

$$1.4 < fA/f < 3.5$$

where f is a focal length of the optical system.

11. The optical system according to claim 1, wherein the following inequalitys is satisfied:

$$1.00 < f/BF < 3.00$$

where f is a focal length of the optical system, and BF is a backfocus of the optical system.

12. The optical system according to claim 1, wherein the following inequalitys is satisfied:

$$0.5 < |Fu|/Fm < 25.0$$

where Fm is a focal length of the front unit, and Fu is a focal length of the rear unit.

13. The optical system according to claim 1, wherein the following inequalitys is satisfied:

$$0.10 < dA/BF < 0.60$$

where dA is an on-axis thickness of the fourth lens.

14. The optical system according to claim 1, wherein the following inequalitys is satisfied:

$$0.05 < dB/BF < 0.40$$

where dB is an on-axis thickness of the fifth lens, and BF is a backfocus of the optical system.

15. The optical system according to claim 1, wherein the following inequalitys are satisfied:

$$50 < vdA < 60$$

$$1.45 < NA < 1.60$$

where NA is a refractive index of the fourth lens.

16. The optical system according to claim 1, wherein the following inequalitys are satisfied:

$$15 < vdA < 40$$

$$1.55 < NA < 1.75$$

where NA is a refractive index of the fourth lens.

17. The optical system according to claim 6, wherein the following inequalitys is satisfied:

$$0.20 < -fn/f < 0.70$$

where f is a focal length of the optical system, and fn is a focal length of the third lens.

18. The optical system according to claim 1, wherein the first lens is disposed closest to an object.

19. The optical system according to claim 1, wherein the front unit consists of, in order from an object side to the image side, the first lens, the third lens having a negative refractive power, and the second lens.

20. An image pickup apparatus comprising:
an optical system; and
an image sensor configured to image an optical image formed by the optical system,
wherein the optical system consists of a front unit and a rear unit,
wherein the front unit consists of:
a first lens having a positive refractive power;
a second lens disposed on an image side of the first lens and having a positive refractive power; and
a third lens,
wherein each of the first lens and the second lens has a refractive index of 1.7 or higher for d-line,
wherein the rear unit consists of two or more and four or fewer lenses and includes a fourth lens having a positive refractive power and a fifth lens adjacent to the fourth lens and having a negative refractive power,
wherein each of the fourth lens and the fifth lens is made of an organic material, and
wherein the following inequalities are satisfied:

$$0.75 < vdA/vdB < 1.30$$

$$0.75 < -fA/fB < 1.30$$

$$0.50 < du/BF < 1.50$$

where vdA is an Abbe number of the fourth lens, vdB is an Abbe number of the fifth lens, fA is a focal length of the fourth lens, fB is a focal length of the fifth lens, du is an on-axis distance from a surface vertex closest to an object to a surface vertex closest to an image plane of the rear unit, and BF is a backfocus of the optical system.

* * * * *